United States Patent
Martin et al.

(10) Patent No.: US 11,113,597 B2
(45) Date of Patent: Sep. 7, 2021

(54) ARTIFICIAL NEURAL NETWORK AND METHOD OF TRAINING AN ARTIFICIAL NEURAL NETWORK WITH EPIGENETIC NEUROGENESIS

(71) Applicant: HRL LABORATORIES, LLC, Malibu, CA (US)

(72) Inventors: Charles E. Martin, Santa Monica, CA (US); Nicholas A. Ketz, Madison, WI (US); Praveen K. Pilly, Tarzana, CA (US); Soheil Kolouri, Agoura Hills, CA (US); Michael D. Howard, Westlake Village, CA (US); Nigel D. Stepp, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/561,735

(22) Filed: Sep. 5, 2019

(65) Prior Publication Data

US 2020/0125930 A1   Apr. 23, 2020

Related U.S. Application Data

(60) Provisional application No. 62/750,155, filed on Oct. 24, 2018, provisional application No. 62/749,617, filed on Oct. 23, 2018.

(51) Int. Cl.
  *G06N 3/04*  (2006.01)
  *G06N 3/08*  (2006.01)
  *G06K 9/62*  (2006.01)
(52) U.S. Cl.
  CPC ......... *G06N 3/0472* (2013.01); *G06K 9/6215* (2013.01); *G06N 3/08* (2013.01)

(58) Field of Classification Search
  CPC ........ G06N 3/0472; G06N 3/08; G06N 3/082; G06N 99/005; G06K 9/6215; G06F 17/5009; H04L 67/02
  See application file for complete search history.

(56) References Cited

U.S. PATENT DOCUMENTS 9,015,093 B1 * 4/2015 Commons .......... G01C 21/3602
                                                  706/26
10,001,760 B1 * 6/2018 Hoffmann ............ G05B 13/048
(Continued)

FOREIGN PATENT DOCUMENTS

CN   107590534 A    1/2018
KR   10-2016-0063965 A   6/2016

OTHER PUBLICATIONS

Karras, Tero, et al. "Progressive growing of gans for improved quality, stability, and variation." arXiv preprint arXiv:1710.10196 (2017): 1-26 (Year: 2017).*

(Continued)

*Primary Examiner* — Kamran Afshar
*Assistant Examiner* — Randall K. Baldwin
(74) *Attorney, Agent, or Firm* — Lewis Roca Rothgerber Christie, LLP (57) ABSTRACT

A method for retraining an artificial neural network trained on data from an old task includes training the artificial neural network on data from a new task different than the old task, calculating a drift, utilizing Sliced Wasserstein Distance, in activation distributions of a series of hidden layer nodes during the training of the artificial neural network with the new task, calculating a number of additional nodes to add to at least one hidden layer based on the drift in the activation distributions, resetting connection weights between input layer nodes, hidden layer nodes, and output layer nodes to values before the training of the artificial neural network on the data from the new task, adding the additional nodes to
(Continued)

the at least one hidden layer, and training the artificial neural network on data from the new task.

11 Claims, 8 Drawing Sheets

(56) References Cited

U.S. PATENT DOCUMENTS

| | | | | |
|---|---|---|---|---|
| 2003/0200189 | A1* | 10/2003 | Meng | G06N 3/082 706/26 |
| 2015/0106311 | A1* | 4/2015 | Birdwell | G06N 3/02 706/20 |
| 2016/0155049 | A1* | 6/2016 | Choi | G06N 3/082 706/16 |
| 2017/0177993 | A1* | 6/2017 | Draelos | G06N 3/0454 |
| 2017/0251081 | A1* | 8/2017 | Roychowdhury | H04L 67/02 |
| 2018/0032868 | A1* | 2/2018 | Dani | G06N 3/08 |
| 2019/0114511 | A1* | 4/2019 | Gao | G06K 9/6257 |

OTHER PUBLICATIONS

Kirkpatrick, James, et al. "Overcoming catastrophic forgetting in neural networks." Proceedings of the national academy of sciences 114.13 (2017): 3521-3526. (Year: 2017).*

Liutkus, Antoine, et al. "Sliced-Wasserstein Flows: Nonparametric Generative Modeling via Optimal Transport and Diffusions." arXiv preprint arXiv:1806.08141 (Jun. 2018): 1-27 (Year: 2018).*

Yoon, Jaehong, et al. "Lifelong learning with dynamically expandable networks." arXiv preprint arXiv:1708.01547 (Jun. 11, 2018): 1-11 (Year: 2018).*

Kolouri, Soheil, et al. "Sliced-Wasserstein Autoencoder: An Embarrassingly Simple Generative Model." arXiv preprint arXiv: 1804.01947 (Jun. 27, 2018): 1-25 (Year: 2018).*

Mocanu, Decebal Constantin, et al. "Scalable training of artificial neural networks with adaptive sparse connectivity inspired by network science." Nature communications 9.1 (Jun. 19, 2018): 1-12. (Year: 2018).*

Martin, Charles E., and James A. Reggia. "Self-assembly of neural networks viewed as swarm intelligence." Swarm Intelligence 4.1 (2010): 1-36. (Year: 2010).*

Martin, Charles E. Adapting swarm intelligence for the self-assembly and optimization of networks. Diss. 2011: i-218 (Year: 2011).*

Martin, Charles E., and James A. Reggia. "Fusing swarm intelligence and self-assembly for optimizing echo state networks." Computational intelligence and neuroscience 2015: 1-15 (Year: 2015).*

Kolouri, Soheil, Charles E. Martin, and Heiko Hoffmann. "Explaining Distributed Neural Activations via Unsupervised Learning." 2017 IEEE Conference on Computer Vision and Pattern Recognition Workshops (CVPRW). IEEE, Jul. 2017: 1670-1678 (Year: 2017).*

Draelos, Timothy J., et al. "Neurogenesis deep learning: Extending deep networks to accommodate new classes." 2017 International Joint Conference on Neural Networks (IJCNN). IEEE, 2017: 526-533 (Year: 2017).*

Kolouri, Soheil, Yang Zou, and Gustavo K. Rohde. "Sliced Wasserstein kernels for probability distributions." Proceedings of the IEEE Conference on Computer Vision and Pattern Recognition. 2016: 5258-5267 (Year: 2016).*

Draelos et al., "Neurogenesis Deep Learning," arXiv:1612.03770v2, 8 pages, Mar. 2017.

Kolouri et al., "Sliced-Wasserstein Auto-Encoders," ICLR, 19 pages, 2019.

Parisi et al., "Continual Lifelong Learning with Neural Networks: A Review," arXiv:1802.07569v4, 29 pages, Feb. 2019.

Rusu et al., "Progressive Neural Networks," arXiv:1606.04671v3, 14 pages, Sep. 2016.

Yoon et al., "Lifelong Learning with Dynamically Expandable Networks," ICLR, 11 pages, 2018.

International Search Report and Written Opinion for Application No. PCT/US2019/049726, dated Dec. 26, 2019, 9 pages.

Kirkpatrick et al., "Overcoming catastrophic forgetting in neural networks," PNAS, 114(13): 3521-3526, Mar. 28, 2017/.

Rostami et al., "Complementary Learning for Overcoming Catastrophic Forgetting Using Experience Replay," arXiv:1903.04566v2, 8 pages, Mar. 31, 2019.

* cited by examiner

ARTIFICIAL NEURAL NETWORK AND METHOD OF TRAINING AN ARTIFICIAL NEURAL NETWORK WITH EPIGENETIC NEUROGENESIS

CROSS-REFERENCE TO RELATED APPLICATION(S)

The present application claims priority to and the benefit of U.S. Provisional Patent Application No. 62/750,155, filed Oct. 24, 2018, and U.S. Provisional Patent Application No. 62/749,617, filed Oct. 23, 2018, the entire contents of both of which are incorporated herein by reference.

STATEMENT REGARDING FEDERALLY SPONSORED RESEARCH OR DEVELOPMENT

This invention was made with U.S. Government support under Contract BC2X.104.000. The U.S. Government has certain rights to this invention.

BACKGROUND

1. Field

The present disclosure relates generally to artificial neural networks and methods of training artificial neural networks with epigenetic neurogenesis.

2. Description of the Related Art

Artificial neural networks are utilized in a variety of fields and applications to perform various tasks, such as character recognition, image classification, natural language processing, and various pattern-matching and classification tasks. Artificial neural networks include an input layer, at least one hidden layer, and an output layer, each having a series of neurons or nodes. Outputs of the neurons in one layer are connected to inputs of the neurons in the succeeding layer, and a "weight" is associated with each connection between neurons. To compute the activation state of each neuron, a weighted sum of the inputs to the neurons is performed (i.e., a multiplication of a set of input signals by a set of weights, followed by a summation) and then the linear combination of the weighted inputs is transferred into a thresholding activation function (f(S)) with a transfer function.

To adapt the trained artificial neural network to perform new tasks, many related art approaches do not add neurons to the artificial network, but instead adapt the weights of the connections between the existing neurons. However, this approach is limited by the information storage capacity of the artificial neural network, which is lower for more diverse tasks and input distributions.

Other related art approaches add neurons to the trained artificial neural network, known in the art as neurogenesis, to adapt the artificial neural network to perform new tasks. However, related art neurogenesis typically added neurons in an unprincipled or ad-hoc manner, such as adding a fixed, pre-determined number of neurons to each layer of the artificial neural network when a new task arrives, or adding the neurons through time-consuming trial-and-error methods. These related art approaches fail to fully leverage the redundancy in information between different tasks, for example, by not adapting connections between old neurons when new tasks are being learned, or enforcing very sparse connectivity patterns within the network such that fewer parameters are available to be tuned.

SUMMARY

The present disclosure is directed to various embodiments of a method of retraining an artificial neural network trained on data from an old task. The artificial neural network includes an input layer having a series of input layer nodes, at least one hidden layer having a series of hidden layer nodes, and an output layer having a series of output layer nodes. In one embodiment, the method includes training the artificial neural network on data from a new task different than the old task, calculating a drift, utilizing Sliced Wasserstein Distance, in activation distributions of a series of hidden layer nodes during the training of the artificial neural network with the new task, calculating a number of additional nodes to add to at least one hidden layer based on the drift in the activation distributions, resetting connection weights between input layer nodes, hidden layer nodes, and output layer nodes to the values they had before the training of the artificial neural network on the data from the new task, adding the additional nodes to the at least one hidden layer, and training the artificial neural network on data from the new task.

Data from the old task may include training data retained from input and target output distributions of the old task.

Data from the old task may include synthetic data generated from a model of input and target output distributions of the old task.

Calculating the number of additional nodes may be calculated according to Equation 1: $N_{nodes}=c*\log(D)+b$, where $N_{nodes}$ is the number of additional nodes, c and b are user-specified constants and D is the drift in the activation distributions.

The additional nodes may include a first set of additional nodes and a second set of additional nodes, and the task of adding the additional nodes may include adding the first set of additional nodes to a first hidden layer of the at least one hidden layer and adding the second set of additional nodes to a second hidden layer of the at least one hidden layer. In general, the artificial neural network can have any suitable number of hidden layers, and the methods of the present disclosure can add any suitable number of nodes to any of the hidden layers.

Adding the additional nodes may also include connecting each additional node of the first set of additional nodes to each additional node of the second set of additional nodes.

Adding the additional nodes may include connecting the series of hidden layer nodes in the first hidden layer to the second set of additional nodes added to the second hidden layer.

Adding the additional nodes may include not connecting the first set of additional nodes added to the first hidden layer to the series of hidden layer nodes in the second hidden layer.

The method may also include adding a series of new output layer nodes to the output layer.

Adding the additional nodes may include adding the additional nodes to a last hidden layer of the at least one hidden layer adjacent to the output layer, and connecting the additional nodes only to the series of new output layer nodes.

The method may also include connecting each of the series of nodes of the at least one hidden layer adjacent to the output layer to each of the series of new output layer nodes.

Adding the additional nodes to the at least one hidden layer may include adding the additional nodes to a first hidden layer of the at least one hidden layer, and the method may also include connecting each of the series of input layer nodes to each of the additional nodes in the first hidden layer.

Training the artificial neural network on the data from the new task may include minimizing a loss function with stochastic gradient descent.

The present disclosure is also directed to various embodiments of an artificial neural network trained by epigenetic neurogenesis to perform an old task and a new task. In one embodiment, the artificial neural network includes an input layer having a series of input layer nodes, a first hidden layer having a series of first hidden layer nodes and at least one new first hidden layer node, a second hidden layer having a series of second hidden layer nodes and at least one new second hidden layer node, and an output layer having a series of output layer nodes. The at least one new first hidden layer node is connected to the at least one new second hidden layer node, the at least one new first hidden layer node is not connected to the series of second hidden layer nodes, each of the series of first hidden layer nodes is connected to the at least one new second hidden layer node, and each of the series of input layer nodes is connected to the at least one new first hidden layer node.

The output layer may also include a series of new output layer nodes.

The second hidden layer may be a last hidden layer adjacent to the output layer, and the at least one new second layer hidden node may be connected only to the series of new output layer nodes.

Each of the series of second hidden layer nodes may be connected to each of the series of output layer nodes and each of the series of new output layer nodes.

The second hidden layer may be a last hidden layer adjacent to the output layer, and the at least one new second layer hidden node may be connected to each of the series of the output layer nodes.

Each of the series of input layer nodes may be connected to each of the series of first hidden layer nodes.

Each of the series of first hidden layer nodes may be connected to each of the series of second hidden layer nodes.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a method of training an artificial neural network, which has already been trained on data from one or more old tasks, on data from one or more new tasks. In one or more embodiments, the methods of the present disclosure utilize epigenetic neurogenesis, which includes adding new nodes and connections to the artificial neural network to enable learning of one or more new tasks without performance degradation or substantially without performance degradation of the previously learned tasks (i.e., without catastrophic forgetting of the one or more old tasks that the artificial neural network was trained to perform). Additionally, the method of the present disclosure is configured to integrate the knowledge acquired on the one or more olds tasks with new information to improve performance of the new task with fewer training examples by training both the old and new connections. Furthermore, the methods of the present disclosure are configured to minimize the number of new nodes and connections added to the artificial neural network while achieving performance targets on the one or more new tasks (i.e., the method is configured to minimize the increase in the size and complexity of the artificial neural network necessary to achieve performance targets for the one or more new tasks).

The method of training an artificial neural network with epigenetic neurogenesis according to the present disclosure may be utilized, for instance, in any autonomous or semi-autonomous system that may encounter new tasks to learn and may also be required to revisit old tasks without requiring retraining of the artificial neural network on the old tasks. For example, the methods of the present disclosure may be utilized to enable continual learning in smart aircraft or smart vehicle components that store information, such as sensor and maintenance data, on the components themselves and that are configured to learn a model that can generate realistic synthetic data as needed. The method of training an artificial neural network with epigenetic neurogenesis according to the present disclosure may enable continual learning of these smart components due to changing environmental conditions, changing aircraft/vehicle configurations, and/or the component being placed on different aircrafts or different vehicles over its lifetime. The method of training an artificial neural network with epigenetic neurogenesis according to the present disclosure may also enable, for example, a single aircraft or vehicle visual perception system (e.g., object classification, lane marking detection, and/or drivable surface identification) to be utilized across many diverse aircraft or vehicles because this requires continual learning without forgetting such that the perception system can handle many different environments, models, and model-years. When the methods of the present disclosure are utilized to enable continual learning of an aircraft or vehicle visual perception system, data can be uploaded from the aircraft or the vehicles to remote servers where learning and testing occurs, and then software updates to the perception system can be pushed to the aircraft or the vehicles directly.

Figure 1:
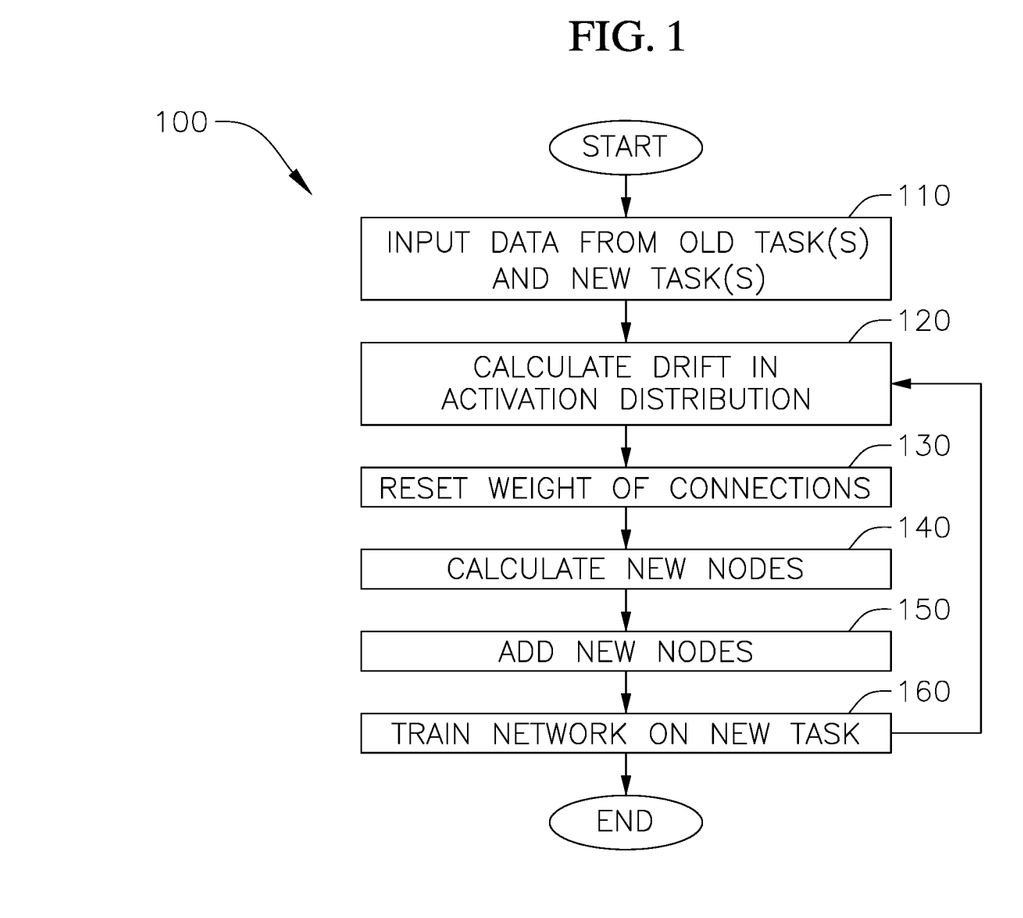
FIG. 1 is a flowchart illustrating tasks of a method of training an artificial neural network according to one embodiment of the present disclosure.
Figure 2:
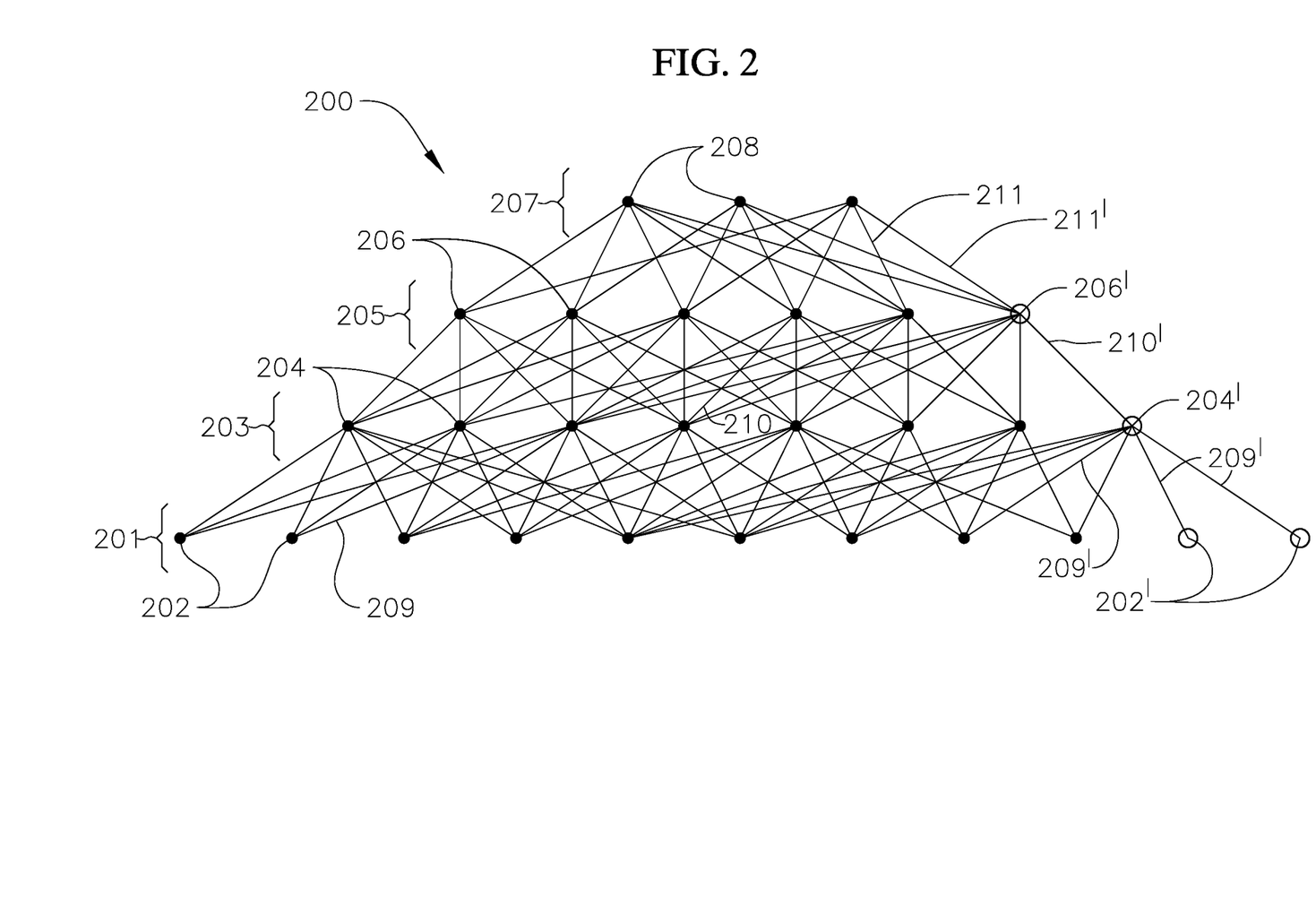
FIG. 2 is schematic view of an artificial neural network being trained according to the method of FIG. 1.

FIG. 1 is a flowchart illustrating tasks of a method 100 of training an artificial neural network (ANN) 200, which has been trained on data from one or more old tasks, on data from one or more new tasks, and FIG. 2 is a schematic view of the artificial neural network 200 being trained according to the method 100 illustrated in FIG. 1. In one or more embodiments, the artificial neural network 200 includes an input layer 201 having a series of input layer nodes 202, a first hidden layer 203 having a series of first hidden layer nodes 204, a second hidden layer 205 having a series of second hidden layer nodes 206, and an output layer 207 having a series of output layer nodes 208. In the illustrated embodiment, a series of connections 209 connect each of the input layer nodes 202 in the input layer 201 to each of the first hidden layer nodes 204 in the first hidden layer 203, a series of connections 210 connect each of the first hidden layer nodes 204 in the first hidden layer 203 to each of the second hidden layer nodes 206 in the second hidden layer 205, and a series of connections 211 connect each of the second hidden layer nodes 206 in the second hidden layer 205 to each of the output layer nodes 208 in the output layer 207. Moreover, each of the connections 209, 210, 211 between the nodes in adjacent layers have an associated connection weight. Additionally, each of the nodes 202, 204, 206, 208 in the artificial neural network 200 is associated with an activation function configured to receive the inputs to the nodes 202, 204, 206, 208 as arguments to the activation function and compute an output value for the nodes 202, 204, 206, 208 based on the inputs to determine the activation states of the nodes 202, 204, 206, 208. Although in the illustrated embodiment the artificial neural network 200 includes two hidden layers 203, 205, in one or more embodiments, the artificial neural network 200 may include any other suitable number of hidden layers and each layer may have any suitable number of nodes depending, for instance, on the desired complexity of the task that the artificial neural network is capable of learning and performing. Furthermore, although in the illustrated embodiment the artificial neural network 200 is a fully-connected artificial neural network (i.e., each node is connected to each node in the adjacent layer), in one or more embodiments, the artificial neural network 200 may not be fully connected.

In the illustrated embodiment, the method 100 includes a task 110 of inputting data from the one or more old tasks that the artificial neural network 200 has been trained to perform, as well as data from one or more new tasks that the artificial neural network 200 will be trained to perform, into the input layer 201 of the artificial neural network 200. The data from the one or more old tasks may be real data or synthetic data. For instance, the data from the one or more old tasks may include an amount of training data (e.g., 5%) that has been retained from the input and target output distributions of the one or more old tasks. In one or more embodiments, the data from the one or more old tasks may be synthetic data generated from a model of the input and target output distributions of the one or more old tasks.

In the illustrated embodiment, the method 100 includes also a task 120 of calculating, as the artificial neural network 200 is trained on data from the one or more new tasks according to task 110, a drift in activation distributions of the nodes 204, 206 in the one or more hidden layers 203, 205 with respect to data from the one or more old tasks that the artificial neural network 200 was trained to perform. In an embodiment in which the artificial neural network 200 includes two hidden layers 203, 205, the task 120 of calculating the drift includes calculating the probability distributions $P_{Z1}(Z1|X1)$ and $P_{Z2}(Z2|X1)$ after training the artificial neural network 200 on the old tasks has completed, but before training on a new task begins, where X1 is input data for the old task, Z1 is the activations of the nodes 204 in the first hidden layer 203, and Z2 is the activations of the nodes 206 in the second hidden layer 205. Z1 and Z2 refer to the activations of only the nodes present during training on the old tasks, before a subsequent task of adding one or more nodes to one or more of the hidden layers 203, 205. In one or more embodiments, the task 120 utilizes samples only from the probability distributions $P_{Z1}(Z1|X1)$ and $P_{Z2}(Z2|X1)$, and therefore the task 120 does not require closed-form expressions for the probability distributions, which may be, or may approximately be, Gaussian functions (e.g., the task 120 does not need to estimate closed form expressions for these distributions, such as Gaussians). The task 120 of calculating the drift also includes calculating $\hat{P}_{Z1}(Z1|X1)$ and $\hat{P}_{Z2}(Z2|X1)$ once training of the artificial neural network 200 has begun on a new task. $\hat{P}_{Z1}(Z1|X1)$ and $\hat{P}_{Z2}(Z2|X1)$ are the data distributions in the first and second hidden layers 203, 205, respectively, after training on the new task has begun. In one or more embodiments, $\hat{P}_{Z1}(Z1|X1)$ and $\hat{P}_{Z2}(Z2|X1)$ are determined automatically by changes to the weights in the network that occur as a result of training on the new task. In one or more embodiments, task 120 includes sampling only from this distribution to compute SWD, not a closed-form expression. Additionally, $\hat{P}_{Y1}$ is the target distribution for the first task that the network is trying to learn to map the first task input to $P_{X1}$, and $\hat{P}_{Y2}$ is the target distribution for the first task that the network is trying to learn to map the first task input to $P_{X2}$. The target distributions are defined a priori by the user.

Figure 3:
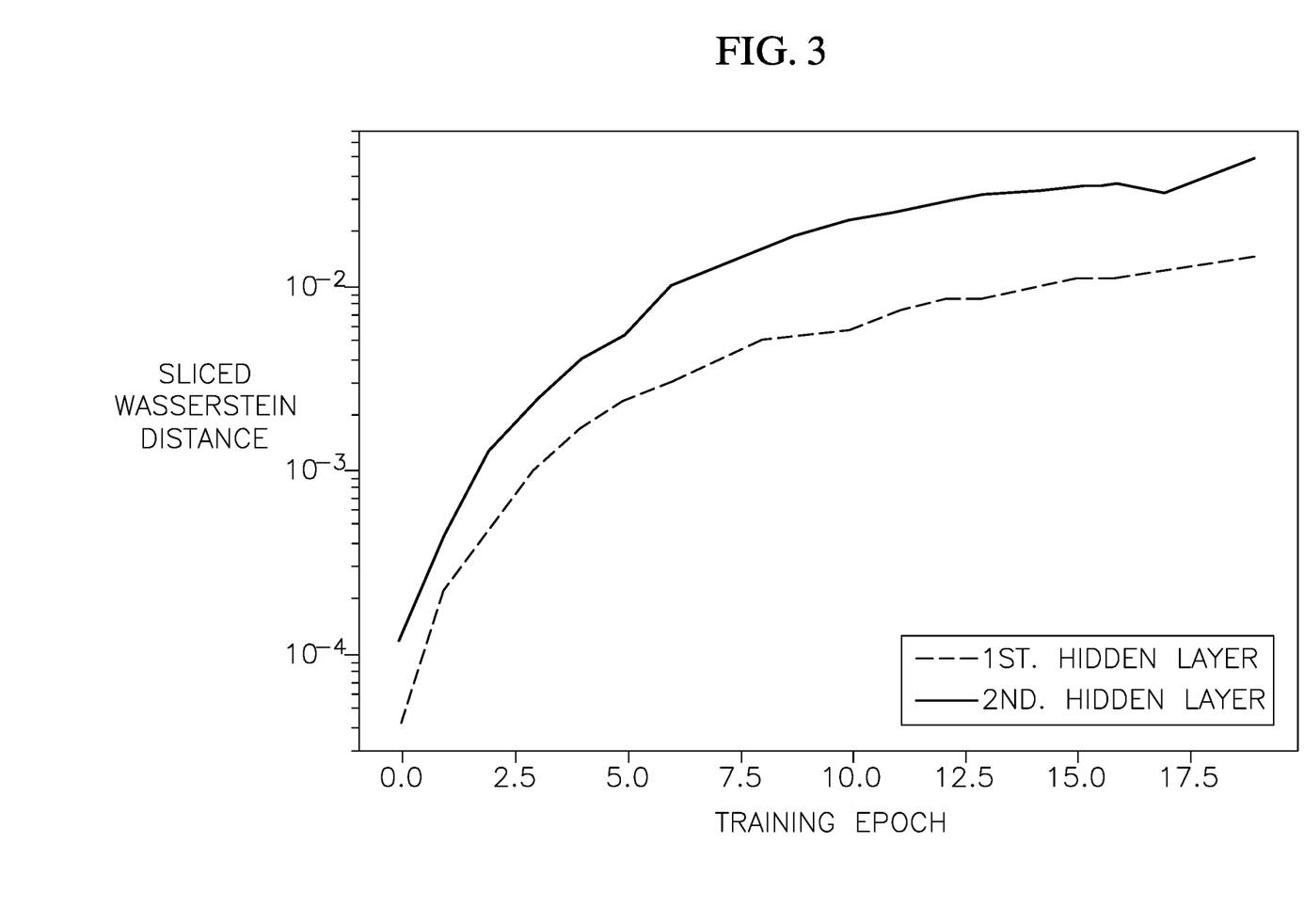
FIG. 3 is a graph depicting drift in the activation distributions of hidden layers of the artificial neural network, calculated with Sliced-Wasserstein Distance, according to one task of the method illustrated in FIG. 1.

The task 120 then includes determining the drift from the probability distributions $P_{Z1}(Z1|X1)$ and $P_{Z2}(Z2|X1)$ utilizing the Sliced Wasserstein Distance (SWD), which is an estimate of the Wasserstein Distance between probability distributions (i.e., the task 120 utilizes SWD to directly measure changes in the activity distributions within different layers of the artificial neural network, which provides a clear signal of information loss and gain and thereby provides a metric for determining when, where, and how many nodes to add to artificial neural network). In one or more embodiments, the task 120 utilizes only samples from the probability distributions $P_{Z1}(Z1|X1)$ and $P_{Z2}(Z2|X1)$ to compute the SWD. The SWD between probability measures $\rho_X$ and $\rho_Y$ may be calculated as follows: $SW_C(\rho_X, \rho_Y) = \int_{S^{d-1}} W_C(\mathcal{R}\rho_x(\bullet; \theta), \mathcal{R}\rho_y(\bullet; \theta)) d\theta$, where $S^{d-1}$ is the d-dimensional unit sphere, $W_C$ is the Wasserstein distance between probability measures $\rho_X$ and $\rho_Y$, $\mathcal{R}\rho_x(\bullet; \theta)$ is the marginal distribution of $\rho_X$ that is obtained from integrating $\rho_X$ over the hyperplane orthogonal to $\theta$, and $\mathcal{R}\rho_y(\bullet; \theta)$ is the marginal distribution of $\rho_y$ that is obtained from integrating $\rho_y$ over the hyperplane orthogonal to $\theta$. SWD is described in more detail in S. Kolouri, P.E. Pope, C. E. Martin, and G. K. Rohde, "Sliced-Wasserstein Auto-Encoders," International Conference on Learning Representations (ICLR 2019), New Orleans, La., US, May 6-May 9, 2019, the entire content of which is incorporated herein by reference. FIG. 3 is a graph illustrating the drift in the activation distributions of the nodes 204, 206 in the hidden layers 203, 205 as training progresses on the new task. Although some drift may be acceptable, too much drift may be a problem because it indicates that the parent network is forgetting how to solve the old task (Task 1). As described below, the purpose of the SWD term in the loss function (Equation 2) is to limit the amount of drift when learning a new task, and the user-specified parameter λ in Equation 2 controls how much drift is allowed. In one embodiment, the method includes training the artificial neural network 200 on the new task data drawn from $P_{X2}(X2)$, where X2 is input data for the new task, for N steps (which is any natural number) and then computing the drifts $D1=SWD(P_{Z1}, \hat{P}_{Z1})$ and $D2=SWD(P_{Z2}, \hat{P}_{Z2})$, where D1 measures the drift in $P_{Z1}$ and D2 measures the drift in $P_{Z2}$ after N steps of training on the new task. Although the above-described tasks are described with reference to an artificial neural network having two hidden layers, it will be apparent to a person having ordinary skill in the art how to adapt the above-described tasks to an artificial neural network having any other number of hidden layers, such as a single hidden layer or three or more hidden layers.

Additionally, in the illustrated embodiment, after the task 120 of calculating the drifts D1 and D2, the method 100 includes a task 130 of resetting the weights of the connections 209, 210, 211 between the nodes 202, 204, 206, 208 to the values they had before training the artificial neural network 200 on the new task began. The purpose of allowing the weights to change initially is to enable calculation, in task 120, of the drifts (D1, D2, DN) in activation distributions of the nodes.

The method 100 also includes a task 140 of calculating, based on the drifts D1 and D2 calculated in task 120, the number of nodes, if any, to add to one or more of the hidden layers 203, 205 of the artificial neural network 200. This task 140 is performed utilizing a function, F(D), that maps the drift D determined by SWD in task 120, to the number of nodes, $N_{nodes}$, to add to a hidden layer 203, 205. In one or more embodiments, the function F(D) is restricted to the range [0, M], where M is a user-specified upper-bound on the number of new nodes, $N_{nodes}$, that can be added to a hidden layer, and the function F(D) is a monotonic increasing function. In one or more embodiments, the function for calculating the number of new nodes to add to a hidden layer is as follows:

$$N_{nodes}=c*\log(D)+b \quad \text{(Equation 1)}$$

where D is the drift calculated by SWD in task 120 and b and c are user-specified parameters. The user-specified parameters b and c are application-specific, and therefore the user-specified parameters b and c may be any values suitable for the intended application of the method 100 and the artificial neural network 200. Additionally, in one or more embodiments, the task 140 of calculating the number of nodes to add to a hidden layer 203, 205 includes rounding the output of the function F(D) to the nearest natural number. In one or more embodiments, the function F(D) for mapping the drift to the number of new nodes to add to a hidden layer may have any other suitable form specified by the user, depending, for instance, on the nature of the new task the artificial neural network 200 is being trained to learn.

In the illustrated embodiment, the method 100 also includes a task 150 of adding the new nodes, which were calculated in task 140, to the one or more hidden layers 203, 205 of the artificial neural network 200. FIG. 2 shows an example in which the task 150 includes adding two new nodes 202' to the input layer 201, adding one node 204' to the first hidden layer 203, and adding one node 206' to the second hidden layer 205. In one or more embodiments, the task 150 may include adding any other suitable number of nodes to the layers of the artificial neural network 200, depending, for instance, on the nature of the new task that the artificial neural network is being trained to learn. Additionally, in one or more embodiments, the method 100 may include a task of adding a new output layer having a series of new output layer nodes to the artificial neural network 200. In one or more embodiments, the method 100 may include the task of adding the new output layer to the artificial neural network 200 only if the new task requires identifying new types of classes or the new target output distribution is significantly different from the target output distribution on the old tasks.

Additionally, in the illustrated embodiment, the task 150 of adding the new nodes 202', 204', 206' includes connecting the new nodes 202', 204', 206' according to the following scheme: (i) each new node added to hidden layer L is connected to each of the new nodes added to hidden layer L+1, if such new nodes are added (e.g., the new node 204' added to the first hidden layer 203 is connected to the new node 206' added to the second hidden layer 205); (ii) if a new output layer is added and new nodes are added to the last hidden layer (i.e., the hidden layer adjacent to the output layer), each new node added to the last hidden layer connects only to the nodes in the new output layer; (iii) if a new output layer is not added and new nodes are added to the last hidden layer (i.e., the hidden layer adjacent to the output layer), each new node added to the last hidden layer connects only to the nodes in the old output layer; (iv) the new nodes added to one or more of the hidden layers are not connected to the old nodes in the one or more hidden layers (e.g., the new nodes 204' added to the first hidden layer 203 are not connected to the old nodes 206 in the second hidden layer 205); (v) the old nodes in hidden layer L are connected to the new nodes in hidden layer L+1, if such nodes are added (e.g., the old nodes 204 in the first hidden layer 203 are connected to the new nodes 206' added to the second hidden layer 205); (vi) input layer nodes are connected to the new nodes added to the first hidden layer, if such nodes are added (e.g., the input layer nodes 202 are connected to the new nodes 204' added to the first hidden layer 203); and (vii) the weights of the new connections are assigned random values from a pre-defined distribution (e.g., uniform or Gaussian).

In the illustrated embodiment, the method 100 also includes a task 160 of training the artificial neural network 200 on data from the new task after the new nodes 202', 204', 206' have been added to the one or more hidden layers of the artificial neural network 200 and the connections to and from the new nodes 202, 202', 204, 204', 206, 206' have been made in accordance with the scheme described above. In one or more embodiments, the task 160 of training the artificial neural network 200 includes minimizing the following loss function using stochastic gradient descent:

$$\text{Loss}=\min_{\theta,\psi}D(P_{Y_2},\hat{P}_{Y_2})+D(P_{Y_1},\overline{P}_{Y_1})+\lambda\Sigma_i SWD(P_{Z_i},\hat{P}_{Z_i}) \quad \text{(Equation 2)}$$

where Y1 is the target output of the artificial neural network for the old task, Y2 is the target output of the artificial neural network for the new task, θ are the network weights on the connections 209, 210, 211 between the nodes 202, 204, 206 that were present during learning of the old tasks (i.e., before the new nodes 202', 204', 206' were added), and ψ are the weights on the newly added connections 209', 210' 211' (e.g., the weights on the newly added connections to and from the new nodes added to the one or more hidden layers and/or to the nodes in the new output layer). The task 160 of training the artificial neural network 200 on data from the new task includes training both old weights (θ) and new weights (ψ)

when learning a new task. The first term in the loss function (Equation 2) is a distance measurement D between the target output distribution for the new task $\hat{P}_{Y_2}$ and the network output conditioned on input data from the new task $P_{Y_2}$. In one or more embodiments, the distance measurement D for classification tasks may be the cross-entropy and for regression tasks the distance measurement D may be the mean squared error (MSE). The distance measurement D term allows the artificial neural network 200 to learn the target input-output mapping for the new task. The second term in the loss function (Equation 2) involves the same distance measurement D, but it is between the target output distribution on the old task(s) $\hat{P}_{Y_1}$ and the network output conditioned on the old task(s) $P_{Y_1}$. The second term of the loss function helps prevent the artificial neural network from forgetting the target input-output mapping for the old task(s) while the new task is being learned. In one or more embodiments, the loss function (Equation 2) may not include the second term (e.g., the second term of the loss function is optional and may not be included if, for instance, a new output layer has been added to the artificial neural network 200). In one or more embodiments, the loss function (Equation 2) may include the second distance measurement term when a new output layer has been added to the artificial neural network 200 and data from the target distribution $\hat{P}_{Y_1}$ is available. The third term of the loss function (Equation 2) not only helps prevent catastrophic forgetting of old tasks, but also enables some drift in the hidden distributions, which promotes integration of information from old and new tasks, thus reducing the required size of the artificial neural network 200 (i.e., minimizing or at least reducing the number of nodes and connections) for a given performance level. The user-specified coefficient λ controls the trade-off between maintaining performance on old tasks versus having smaller networks that perform well on the new task. Larger values of λ limit drift in the hidden distributions, thus preserving performance on old tasks, but achieving a given performance level on the new task requires the addition of a greater number of new nodes. On the other hand, smaller values of λ permit larger drift, thus allowing smaller networks, but some performance on old tasks will be sacrificed. In one or more embodiments, the value for λ may be set in a range from 1.0 to 10.0, although the value of λ may be any other value suitable for the new task the artificial neural network is learning.

During the task 160 of training the artificial neural network 200 on the new task, the performance gains/losses are monitored. If after a user-specified number of training epochs the performance has not reached a user-specified target, then the method 100 may include a task of adding additional nodes to the artificial neural network 200. The limit on the number of training epochs may be set, for instance, based on computational resources and/or time constraints, and the performance target may be set based on the specific application for which the artificial neural network 200 is being utilized.

Figure 4:
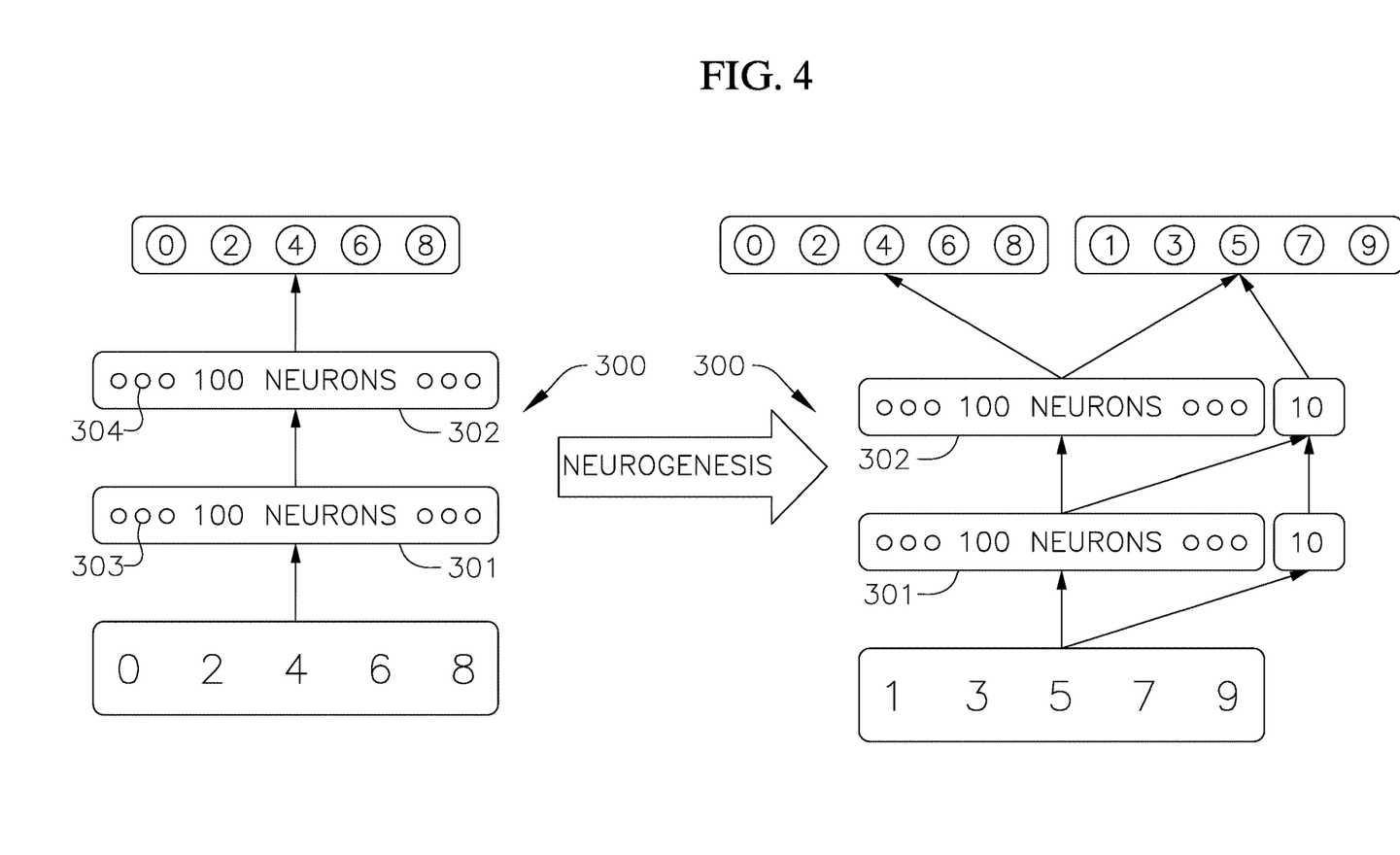
FIG. 4 is a schematic view of an artificial neural network, which was trained according to the method of FIG. 1, being tested on the MNIST handwritten digit dataset.

FIG. 4 is a schematic view of an artificial neural network 300, before and after being trained according to the method of FIG. 1, being tested on the MNIST handwritten digit dataset, which is a benchmark problem for optical character classification. The even digits (0, 2, 4, 6, 8) served as the "old task" and the odd digits (1, 3, 5, 7, 9) served as the "new task." The artificial neural network 300 on the left of FIG. 4 depicts the artificial neural network 300 after it has been trained to perform the old task (i.e., classifying odd handwritten digits 1, 3, 5, 7, and 9), but before it has been trained in accordance with the method of FIG. 1 to perform the new task (i.e., classifying even handwritten digits 2, 4, 6, 8). The input data included 784-dimensional binary vectors, where each vector represents the back-and-white pixel values of a handwritten digit. The artificial neural network 300 in the illustrated embodiment, before it has been trained in accordance with the method of FIG. 1, includes two fully connected hidden layers 301, 302 each with one-hundred (100) nodes 303, 304, respectively, and their respective activation functions. In the illustrated embodiment, a softmax layer at the output with a cross-entropy loss was utilized. Additionally, in the illustrated embodiment, artificial neural network 300, after being trained on the old task but before being trained on the new task, achieved 98.6% classification accuracy on a held-out testing set of handwritten digits. After the artificial neural network was trained and tested on the old task, 5% of the old task training data was retained for retraining the artificial neural network on the new task.

The artificial neural network 300 on the right side of FIG. 4 depicts the artificial neural network 300 after it has been trained in accordance with the method illustrated in FIG. 1. In the illustrated embodiment, a new output layer has been added to the artificial neural network 300 because the new task requires identifying different classes than the old task (i.e., even digits identified in the old task and the odd digits identified in the new task are in different classes). Drifts D1 and D2 in the activations in the hidden layers 301, 302, respectively, were calculated utilizing SWD as training on the new task progressed. Based on the calculation of the drifts D1 and D2, ten (10) new nodes were added to each of the hidden layers 301, 302 and the new nodes were connected according to the scheme described above, as illustrated in the artificial neural network 300 on the right side of FIG. 4.

The weights of the connections between the nodes were then reset to their values before the training on the new task began. Once the weights had been reset, training on the new task (i.e., classifying odd handwritten digits) proceeded by minimizing the loss defined by Equation 2 above. In the illustrated embodiment, the user-specified coefficient λ in Equation 2, which sets the amount of drift permitted in the activation distribution in the hidden layers and thereby controls the trade-off between maintaining performance on old tasks versus having smaller networks that perform well on the new task, was set to 1. Following training of the weights on the old and new connections, the artificial neural network 300 achieved 98.1% accuracy on the old task (i.e., classifying even-numbered handwritten digits) and 98.5% accuracy on the new task (i.e., classifying odd-numbered handwritten digits).

Figure 5:
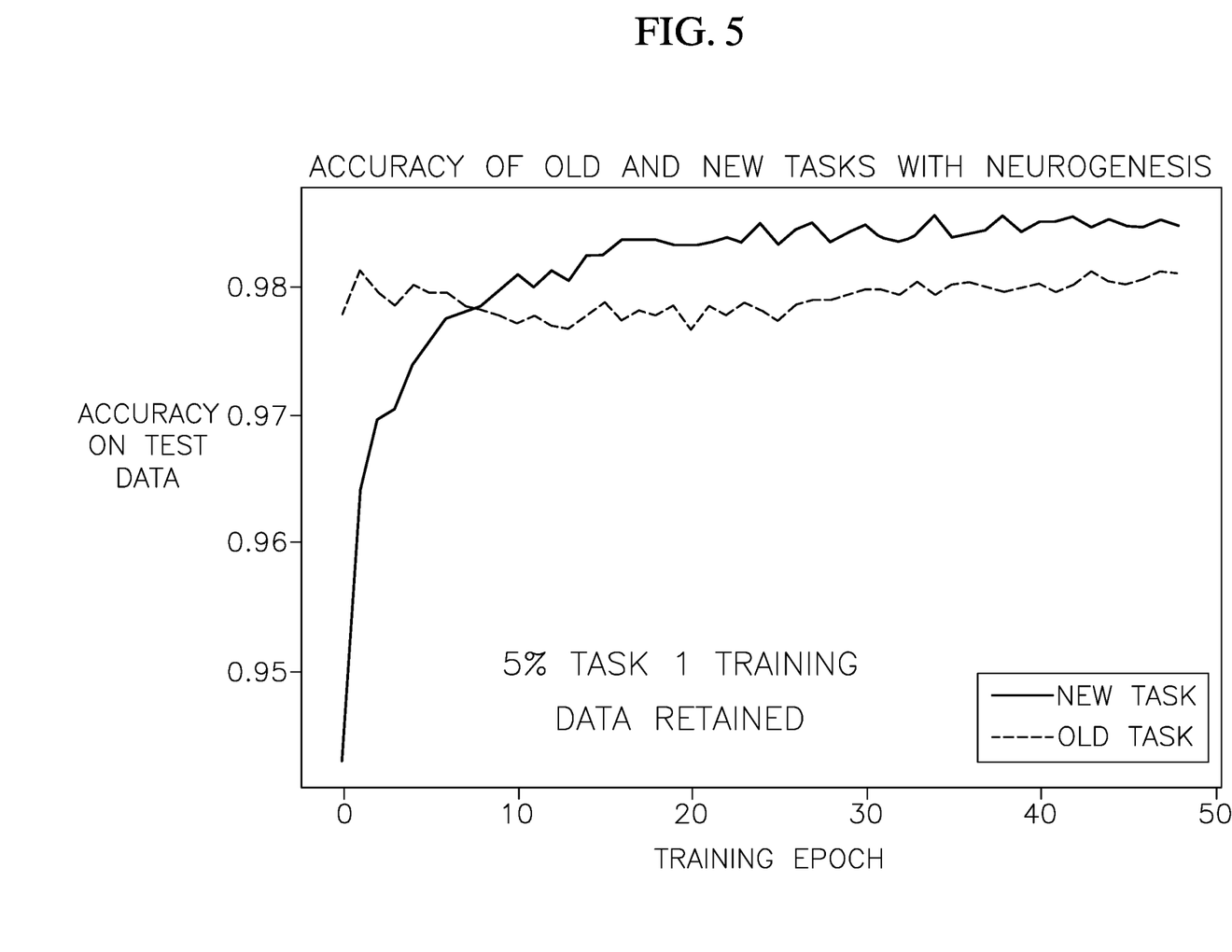
FIG. 5 is a graph illustrating training progression of the artificial neural network after the new nodes have been to the artificial neural network.

FIG. 5 is a graph illustrating training progression of the artificial neural network 300 after the new nodes have been to the artificial neural network 300. As illustrated in FIG. 5, almost no performance was lost on the old task and an equally high level of effectiveness was achieved on the new task. Furthermore, the overall size of the artificial neural network 300 needed to be increased by only 10% (i.e., 10 new nodes were added to each of the hidden layers that originally included 100 nodes). In comparison, when the artificial neural network 300 was trained on both the old and new tasks simultaneously, the artificial neural network 300 achieved 98.0% accuracy. Accordingly, the systems and methods of the present disclosure are capable of learning tasks continually with accuracies just as good learning tasks simultaneously, which is generally easier.

The artificial neural networks of the present disclosure, and the methods of retraining the artificial neural networks according to various embodiments of the present disclosure, were also tested with a variant of the MNIST optical character recognition problem. First, a neural network was trained to classify gray-scale images of handwritten digits from 0 to 9 (old task). The images were flattened into a 748-dimensional vector. The network consisted of 3 hidden layers with hyperbolic tangent activation functions. There were 50, 30, and 20 neurons in the first, second, and third hidden layers, respectively. A new task was created by randomly generating a permutation mask and applying it to each of the digits in the dataset. The permutation mask was created by randomly selecting two non-intersecting sets of pixel indices, and then swapping the corresponding pixels in each image. In one set of experiments, 50% of the pixels in each image were modified. The resulting new task was similar enough to the old task that some information from the old network was still valid, but different enough that adding new neurons significantly improved performance on the new task. The maximum number of new neurons that could be added to any layer was set at 50, which leads to a total of $50^3=125,000$ unique individuals, where an "individual" is a parent network (trained on the old task) with new neurons added to it. The parameter $\lambda$ in Equation 2 above was set to 10.0. It was determined that smaller values of $\lambda$ resulted in the complexity term dominating the fitness, which resulted in a fairly simple fitness landscape with the global optimum being achieved by adding only 1 to 3 neurons at any layer. Setting $\lambda=10.0$ provided a better balance between accuracy and complexity, and consequently, a more challenging optimization problem with many good, but suboptimal, local minima. In this setting, the global optimum is achieved by adding 17 new neurons to the first hidden layer and no new neurons to the second and third hidden layers. However, good, but suboptimal, local minima can be achieved by adding new neurons to only the second or third hidden layers.

A genetic algorithm (GA) was utilized as basis for comparison with embodiments of the present disclosure. Genetic algorithms are a good fit to this problem due to the discrete nature of the search space. For the GA, an individual was encoded as a vector of length three, where the values of the components indicated the number of new neurons to add in each of the three hidden layers. The maximum number of new neurons that could be added to any layer was 50. A population size of 30 and tournament selection with a tournament size of 3 was utilized. Among the selected population, an individual was chosen for crossover with another randomly chosen individual with probability 0.5 and was chosen for mutation with probability 0.2. Once selected for mutation, each entry in the individual was mutated uniformly at random with probability 0.3 to a value in the interval [0, 50]. The relatively high mutation rate was found to prevent pre-mature convergence to poor solutions. Two-point crossover with the crossover points being selected uniformly at random was utilized.

Figure 6:
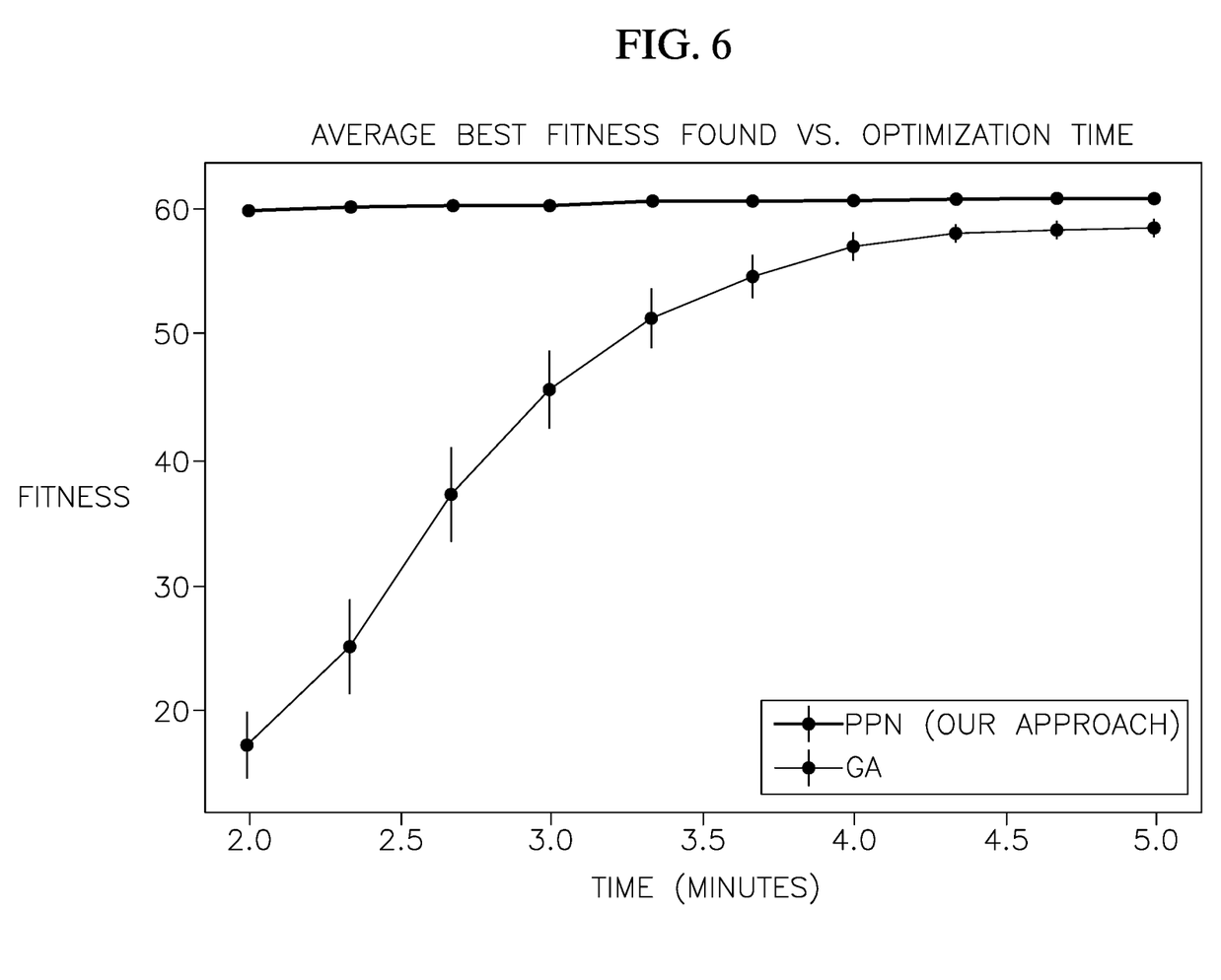
FIGS. 6-8 are graphs comparing the performance of artificial neural networks of the present disclosure (PPN) to the performance of a genetic algorithm (GA).
Figure 7:
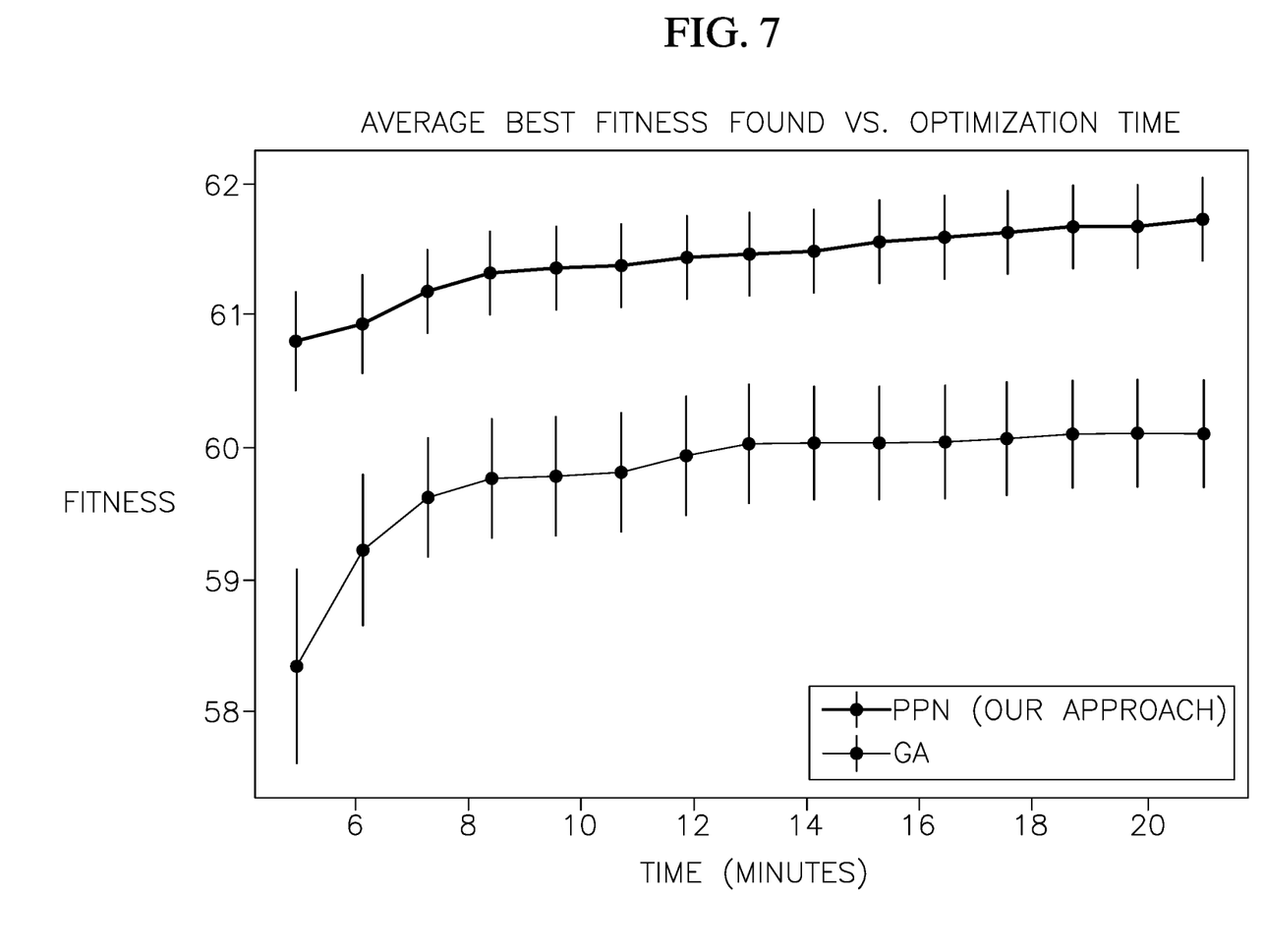

The performance according to embodiments of the present disclosure (referred to hereinafter as, probabilistic program neurogenesis (PPN)), was compared to the performance of the GA. In this embodiment, the PPN decided where and how many new neurons to add to the artificial neural network without utilization of Equation 1 above. A total of 159 trials for the two approaches combined were performed. Each trial started with a newly initialized population, and parameters in the case of the probabilistic program learner (PPL), and then the optimization process was run for 21 minutes of wall-clock time. The results of the first analysis are shown in FIGS. 6 and 7. In each of FIGS. 6 and 7, the error bars are 90% confidence intervals. Each figure shows the average best fitness achieved by the PPN (blue) and GA (red) as a function of elapsed run time in minutes. FIG. 6 is from 2 to 5 minutes and the FIG. 7 is from 5 to 21 minutes. The fitness values used for plotting have been shifted by −8.0 and scaled by 10.0. This was done solely for the purpose of improving visual interpretability of the results. Based on the curves in FIG. 6, it can be seen that on average PPN reaches near optimal solutions (a fitness of about 60.0) within the first 2 minutes of simulation time, whereas it takes the GA about 5 minutes to reach a comparable level of fitness. FIG. 7 shows that in the long run that the PPN continues to improve and outperform the GA.

Figure 8:
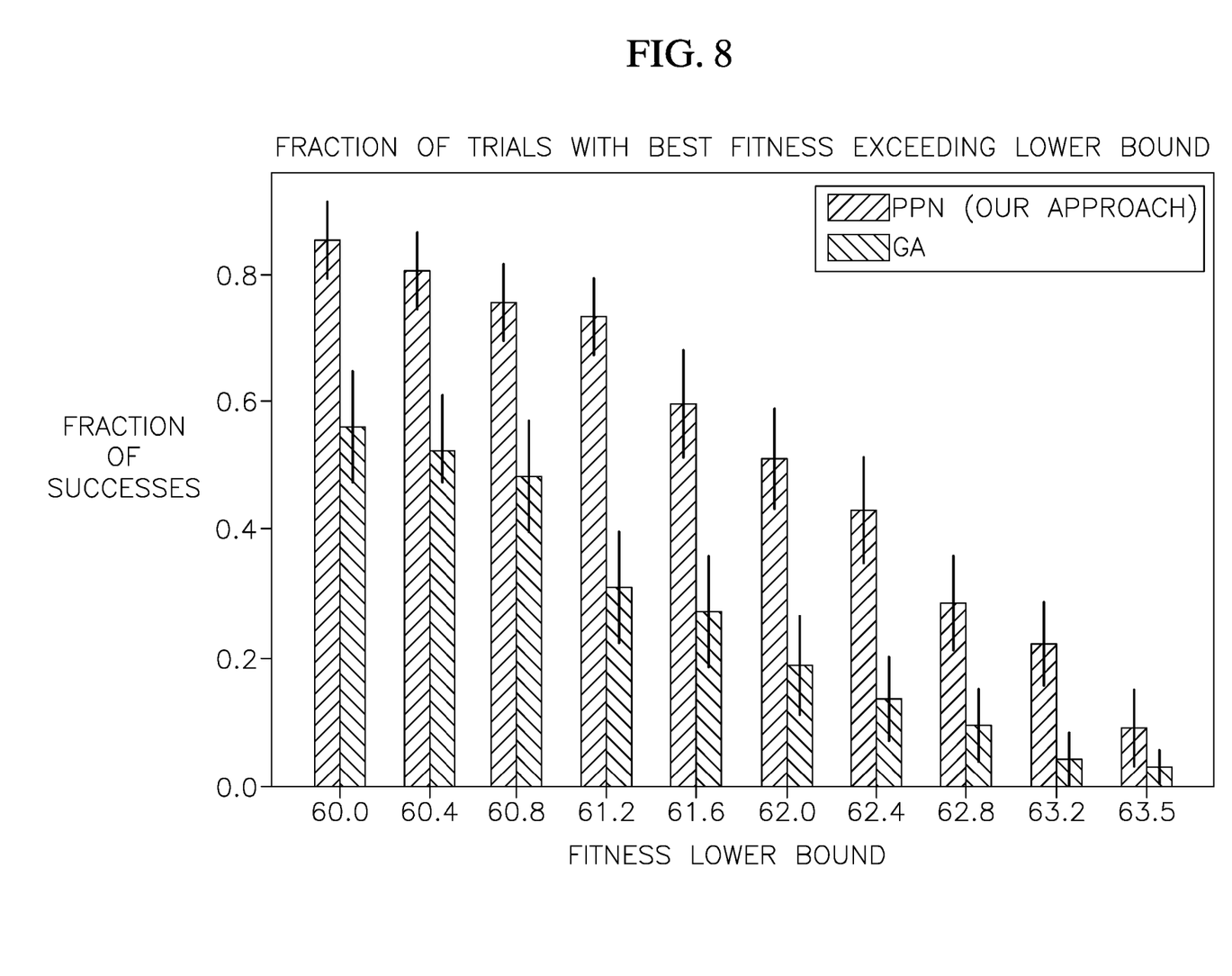

The next analysis examined the consistency with which the PPN and GA were able to find solutions that achieved particular fitness levels. FIG. 8 shows the fraction of trial runs on which the best fitness found exceeded various lower bounds. The results for the PPN are in blue and those of the GA are in red. In FIG. 8, the error bars are 90% confidence intervals. As shown in FIG. 8, for each fitness lower bound on the x-axis, the PPN exceeds the success frequency of the GA, and for the higher, more difficult to achieve fitness levels (>61) the success rate of the PPN is at least double that of the GA. These results demonstrate that the PPN finds better solutions than the GA.

The artificial neural network and/or any other relevant smart devices or components (e.g., smart aircraft or smart vehicle devices or components) according to embodiments of the present invention described herein may be implemented utilizing any suitable smart hardware, firmware (e.g. an application-specific integrated circuit), software, or a combination of software, firmware, and hardware. For example, the various components of the artificial neural network may be formed on one integrated circuit (IC) chip or on separate IC chips. Further, the various components of the artificial neural network may be implemented on a flexible printed circuit film, a tape carrier package (TCP), a printed circuit board (PCB), or formed on one substrate. Further, the various components of the artificial neural network may be a process or thread, running on one or more processors, in one or more computing devices, executing computer program instructions and interacting with other system components for performing the various smart functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims, and equivalents thereof.

What is claimed is:

1. A method for retraining an artificial neural network trained on data from an old task, the artificial neural network comprising an input layer having a plurality of input layer nodes, a plurality of hidden layers comprising at least a first hidden layer and a second hidden layer each having a plurality of hidden layer nodes, an output layer having a plurality of output layer nodes, and a plurality of old connections connecting the plurality of input layer nodes, the plurality of hidden layer nodes, and the output layer nodes, the method comprising:
   training the artificial neural network on data from the old task and data from a new task different than the old task;
   calculating a drift, utilizing Sliced Wasserstein Distance, in activation distributions of the plurality of hidden layer nodes during training of the artificial neural network with the data from the old task and data from the new task;
   calculating a number of additional nodes to add to at least one of the plurality of hidden layers based on the drift in the activation distributions;
   resetting connection weights between the plurality of input layer nodes, the plurality of hidden layer nodes, and the plurality of output layer nodes to values before the training of the artificial neural network on the data from the new task;
   adding a first set of additional nodes of the number of additional nodes to the first hidden layer of the plurality of hidden layers, connecting the first set of additional nodes with new connections, and not connecting the first set of additional nodes added to the first hidden layer to the plurality of hidden layer nodes in the second hidden layer; and
   training both the old connections and the new connections of the artificial neural network on data from the new task,
   wherein the calculating the number of additional nodes is calculated according to Equation 1:

$$N_{nodes} = c*\log(D) + b \quad \text{(Equation 1)}$$

wherein $N_{nodes}$ is the number of additional nodes, c and b are user-specified constants and D is the drift in the activation distributions.

2. The method of claim 1, wherein data from the old task comprises training data retained from input and target output distributions of the old task.

3. The method of claim 1, wherein the data from the old task comprises synthetic data generated from a model of input and target output distributions of the old task.

4. The method of claim 1, wherein:
   the number of additional nodes further comprises a second set of additional nodes, and
   the method further comprises adding the second set of additional nodes to the second hidden layer of the plurality of hidden layers.

5. The method of claim 4, further comprising connecting each additional node of the first set of additional nodes to each additional node of the second set of additional nodes.

6. The method of claim 5, further comprising connecting the plurality of hidden layer nodes in the first hidden layer to the second set of additional nodes added to the second hidden layer.

7. The method of claim 1, further comprising adding a plurality of new output layer nodes to the output layer.

8. The method of claim 7, further comprising adding additional nodes of the number of additional nodes to a last hidden layer of the plurality of hidden layers adjacent to the output layer, and connecting the additional nodes only to the plurality of new output layer nodes.

9. The method of claim 8, further comprising connecting each of the plurality of nodes of the last hidden layer adjacent to the output layer to each of the plurality of new output layer nodes.

10. The method of claim 1, further comprising connecting each of the plurality of input layer nodes to each of the additional nodes in the first hidden layer.

11. The method of claim 1, wherein the training the artificial neural network on the data from the new task includes minimizing a loss function with stochastic gradient descent.

* * * * *

UNITED STATES PATENT AND TRADEMARK OFFICE
CERTIFICATE OF CORRECTION

| | | |
|---|---|---|
| PATENT NO. | : 11,113,597 B2 | Page 1 of 1 |
| APPLICATION NO. | : 16/561735 | |
| DATED | : September 7, 2021 | |
| INVENTOR(S) | : Charles E. Martin et al. | |

It is certified that error appears in the above-identified patent and that said Letters Patent is hereby corrected as shown below:

In the Specification

In Column 1, Lines 15-21, delete:
"STATEMENT REGARDING FEDERALLY SPONSORED RESEARCH OR DEVELOPMENT
This invention was made with U.S. Government support under Contract BC2X.104.000. The U.S. Government has certain rights to this invention."

And insert:
--GOVERNMENT LICENSE RIGHTS
This invention was made with government support under Contract No. FA8750-18-C-0103 awarded by DARPA. The government has certain rights in the invention.--

Signed and Sealed this
Eleventh Day of June, 2024

Katherine Kelly Vidal
*Director of the United States Patent and Trademark Office*